May 26, 1931. G. J. GIBBENS 1,806,622
PLANT SETTING MACHINE
Filed Sept. 6, 1927

INVENTOR
Gabriel J. Gibbens
BY
ATTORNEY

Patented May 26, 1931

1,806,622

UNITED STATES PATENT OFFICE

GABRIEL J. GIBBENS, OF HUTCHINSON, KANSAS

PLANT SETTING MACHINE

Application filed September 6, 1927. Serial No. 217,576.

This invention relates to plant setters and the primary object is to provide a machine which will set out plants as it passes over the ground. Thus the plants can be set out over a large field in a relatively short time and each plant may, if desired, be supplied with water and fertilizer. The invention consists of a wheeled frame which supports the mechanism and the novel details of construction will be apparent by reference to the following description in connection with the accompanying drawings in which:

Fig. 5 is a fragmentary perspective view of the cam for actuating the plant holder.

Figures 3, 4:
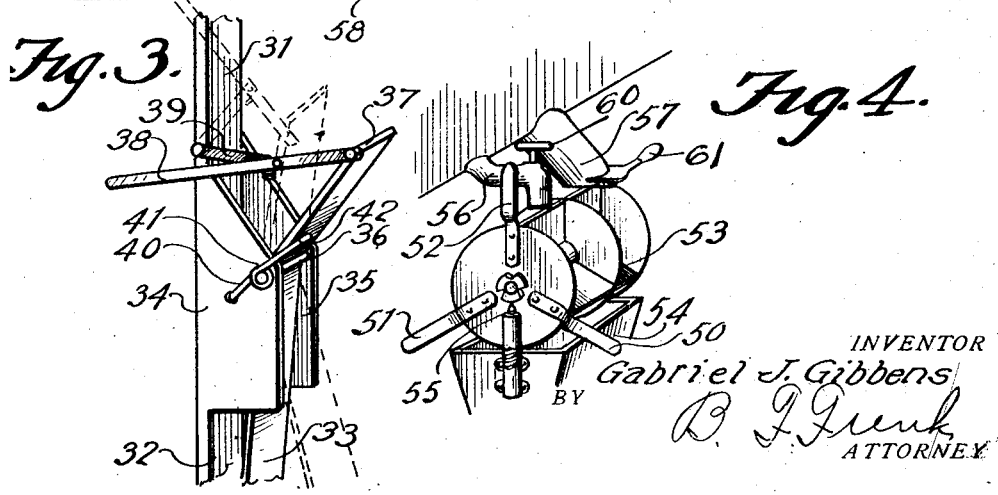
Fig. 3 is a perspective view of the plant holder.
Fig. 4 is a perspective view of parts of the water and fertilizer tanks, the nozzles therefor and the measuring and distributing devices.

1 is a rectangular frame supported at its forward end by wheels 2 and 3 and at its rear end by wheels 4 and 5 on spindles 6 and 7. An adjustable frame 8 is supported above the frame 1 by bails or links 9 and 10 in the form of cranks. The bail 9 is connected to a lever 11 having a pawl mechanism to engage a rack-segment 13 on the frame 1. The handle of the lever 11 is adjacent to the driver's seat 14 so that the driver can swing the lever to raise and lower the frame 8 and since the frame 8 carries the tanks 15 and 16 for the water and fertilizer respectively and since one of the tanks carries a plow-shoe or opener 17, it is obvious that the driver may raise and lower the shoe or opener 17 without getting off the seat. The machine can be pulled over the ground by suitable power applied to the draft bar 18. The power for operating the mechanism is taken off the wheel 2, so there is a clutch 19 controlled by a clutch lever 20 adjacent to the driver's seat so the mechanism can be started and stopped by the driver. When the clutch is "in", a sprocket 21 is driven which drives a sprocket chain 22 to rotate a sprocket 23 on a shaft 24 which drives a wheel 25 carrying the plant setting devices. There are three of these shown and they are designated 26, 27 and 28 respectively, the shaft 24 of which is journaled in the bearings 29 and 30 on the frame 8. Each of the plant setting devices 26, 27 and 28, pivotally carried by the wheel 25, is a counterpart of the other, so I will describe but one of them. The construction is best shown in Figure 3. Each plant setting device consists of an elongated bar 31 carrying at one end a rigid clamping jaw 32 which co-operates with a movable clamping jaw 33. The movable clamping jaw is pivoted to the two hopper-forming side flanges 34 and 35 at 36 and it has an outstanding wing 37 connected to an operating lever 38 loosely connected to the bar 31 by a link 39 so that a toggle lever is formed. A spring 40 has one end fastened to the flange 34 with a coil 41 around the pivot 36 for the jaw 33. The other end of the spring has a right angular extension 42 which bears against the wing 37 to tend to force it toward the bar 31 to spread the jaw 33 away from the jaw 32.

Figure 1:
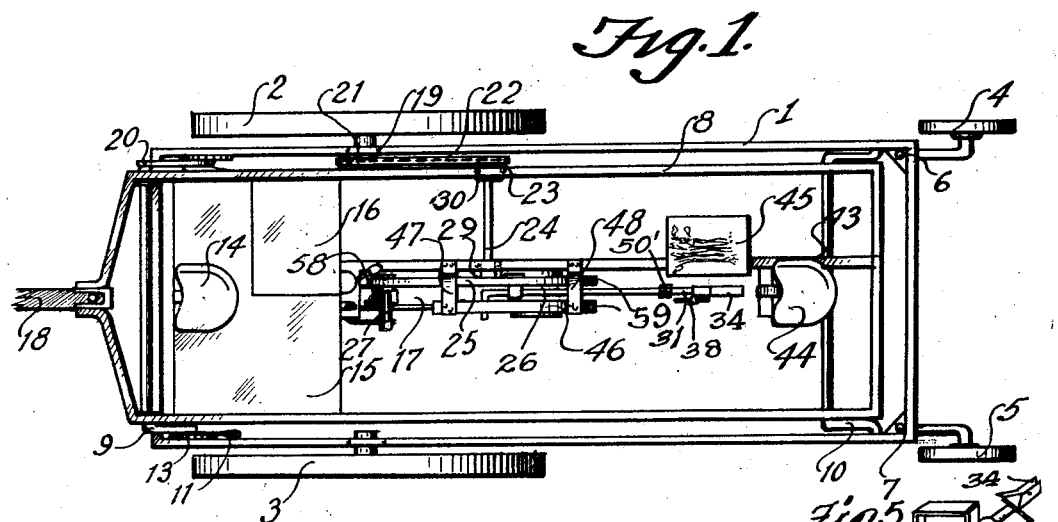
Fig. 1 is a top view.
Figure 2:
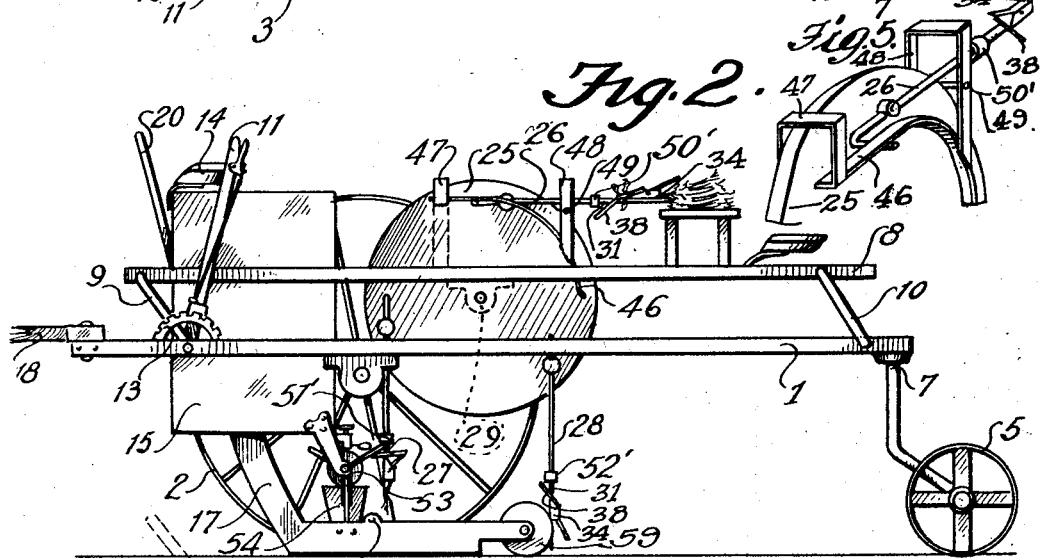
Fig. 2 is a side view.

Carried by the frame 8 is a bar 43 running lengthwise of the machine and on it is a seat 44 in front of which is a platform 45 to carry the plants. As the wheel 25 rotates, the plant setting devices successively move over a cam 46 which is supported by the inverted U-shaped braces or yokes 47 and 48, fast on the bar 43, the cam 46 being on the inside faces of the braces 47 and 48. By reference to Fig. 5, it will be observed that the inverted U-shaped braces 47 and 48 permit the plant holder to pass through them as the wheel 25 turns. As the jaws come opposite the table 45 and in front of the seat 44, they are spread apart. The operator, from seat 44, inserts a plant between the jaws which are in a horizontal plane. As the wheel 25 continues to rotate with the lever 38 in the dotted line position, shown in Figure 3, the lever 38 will contact with a lug 49 on the brace 48 and throw the lever 38 in the full line position shown in Figure 3. The jaws 32 and 33 will now grip the plant and as the plant setter moves off the lug 49, it will assume the position shown by the plant setter 27 in Figure 2. By that time 28 will be moving into the position shown by the gripper 26 in Figure 2.

As each bar 31 rests upon the lug 49 the plant setting device is held in a horizontal plant receiving position, during a part of the rotation of the wheel or until the wheel has rotated far enough to allow the plant setting device to move from lug 49 to assume position shown in Fig. 3. As the plant setter moves downwardly, hanging in a vertical position, lugs 50', 51' and 52' on plant setters 26, 27 and 28 respectively, will strike one of the three arms 50, 51 or 52 on the rotatable water and fertilizer measuring device supported from the tank 15. The measuring device is designated 53 and it rotates in suitable bearings so that by striking one of the arms 50, 51 or 52, it will dump water and fertilizer into the hopper 54 just in front of the plant. A spring pressed bolt 55, on hopper 54, tends to center the compartments of the measuring device and the valves 56 and 57 will be so set that a small amount of water and fertilizer will drop into the compartments between each setting of a plant. When the wheel 25 has rotated far enough so that the ends of the jaws 32 and 33 are entering the ground, the handle 38 will strike against a lug 58 on the shoe 17, moving the arm 38 to the dotted line position shown in Figure 3 so that the plant will be released, the spring being effective in holding the jaws open until they have moved past the operator on seat 44 who in the interval will have inserted a plant between them as previously described. The cycle of operation will continue as long as the machine moves over the ground and so long as there are plants to be fed in between the jaws.

Covering and packing wheels 59, on a shoe 17, are provided so that the plant will be packed in the ground as the machine moves past it.

It is recommended that the traction wheel be so geared to the plant setting wheel 25 that the peripheral speed of the wheel 25 is equal to the lineal speed of the machine so that the bar 31, which happens to be adjacent to the furrow, will remain substantially perpendicular during the time that the jaws 32 and 33 are in the ground, it being understood that the plant is set by the jaws in the bottom of the furrow, opened up by the shoe 17 and that the wheels 59 in rear of the furrow opener will pack the soil around the plant before the jaws begin to move out of the furrow. The water can be turned on or off by manipulating the valve stem 60 in valve element 56. The fertilizer valve 57 is provided with a sliding gate element 61 by means of which the fertilizer may be cut off if desired.

From the foregoing it will be seen that the device can be made practically automatic and that the plants may be set out into the ground at uniform intervals and supplied with water and fertilizer if need be.

What I claim and desire to secure by Letters-Patent is:—

1. A plant setting machine comprising a wheeled frame, a furrow opener carried by the frame, a wheel rotatably supported on the frame, a plurality of plant setting devices connected to the wheel in spaced relation, a cam adjacent to the wheel over which the plant setting devices ride to temporarily hold them in horizontal plant receiving positions, each plant setting device consisting of an elongated bar having at one end a rigid clamping jaw and a movable clamping jaw, the rigid clamping jaw having two hopper forming side flanges to which the movable jaw is pivoted, a spring normally urging the movable jaw into clamping position, and means for releasing the movable clamping jaw.

2. A plant setting machine comprising a wheeled frame, a wheel rotatably supported on the frame, a plurality of plant setting devices carried by the wheel, each plant setting device comprising a bar having a rigid jaw with hopper forming side flanges and a spring actuated movable jaw normally urged toward the rigid jaw, means adjacent to the wheel for opening the jaws, means adjacent to the wheel for holding the plant setting devices in horizontal plant receiving positions during a part of the rotation of the wheel which supports them, and plant releasing means near the bottom of the frame.

3. A plant setting machine comprising a wheeled frame, a wheel rotatably supported on the frame, a plurality of plant setting devices carried by the wheel, each plant setting device comprising two plant engaging jaws for positively gripping the plants between them, means adjacent to the wheel for opening the jaws, means adjacent to the wheel for holding the plant setting devices in horizontal plant receiving positions during a part of the rotation of the wheel which supports them and plant releasing means near the bottom of the frame.

4. A plant setting machine comprising a wheeled frame, a wheel rotatably supported on the frame, a plurality of plant setting devices carried by the wheel, each plant setting device comprising a rigid jaw and a spring-actuated movable jaw normally urged toward the rigid jaw, toggle levers connecting the free ends of the movable jaws with the rigid jaw, means adjacent to the wheel for opening the jaws, means adjacent to the wheel for holding the plant setting devices in horizontal plant receiving positions during a part of the rotation of the wheel which supports them and plant releasing means near the bottom of the frame to be engaged by the toggle levers to cause the jaws to open.

5. A plant setting machine comprising a wheeled frame, a furrow opener carried by the frame, a wheel rotatably supported on the frame, a plurality of plant setting devices connected to the wheel in spaced relation, a cam adjacent to the wheel over which the plant setting devices ride to temporarily hold them in horizontal plant receiving positions, each plant setting device consisting of a rigid clamping jaw and a movable clamping jaw, the rigid clamping jaw having two hopper-forming side flanges to which the movable jaw is pivoted, a spring normally urging the movable jaw into clamping position and means for releasing the movable clamping jaw.

In testimony whereof I affix my signature.

GABRIEL J. GIBBENS.